(12) United States Patent
Rothschild et al.

(10) Patent No.: US 11,032,164 B1
(45) Date of Patent: Jun. 8, 2021

(54) EDGE-BASED CLOUD APPLICATION ACCELERATION

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 163 days.

(21) Appl. No.: 16/426,330

(22) Filed: May 30, 2019

(51) Int. Cl.
*H04L 12/24* (2006.01)
*G06F 9/455* (2018.01)

(52) U.S. Cl.
CPC ...... *H04L 41/5051* (2013.01); *G06F 9/45558* (2013.01); *H04L 41/5045* (2013.01); *H04L 41/5096* (2013.01); *G06F 2009/45595* (2013.01)

(58) Field of Classification Search
CPC ............ H04L 41/5051; H04L 41/5045; H04L 41/5096; G06F 9/45558
See application file for complete search history.

(56) References Cited

U.S. PATENT DOCUMENTS

| | | | |
|---|---|---|---|
| 2017/0244647 A1* | 8/2017 | Jin ...................... | G06F 9/45504 |
| 2017/0371692 A1* | 12/2017 | Connolly ............ | G06F 9/45558 |
| 2019/0273668 A1* | 9/2019 | Xia ..................... | H04L 41/0823 |

* cited by examiner

*Primary Examiner* — Suraj M Joshi
(74) *Attorney, Agent, or Firm* — Merchant & Gould P.C.

(57) ABSTRACT

A system, method, and computer readable storage device provide an edge resource marketplace that enables third parties to selectively deploy microservices on an edge network on-demand. For example, an edge computing resource provider can utilize the edge resource marketplace to expose available edge computing resources to third party services providers, and third party services providers can utilize the edge resource marketplace for discovering and determining one or more optimal available edge computing resources for on-demand deployment of a set of microservices as a virtual network function proximate to end users for reduced latency and improved application performance.

20 Claims, 8 Drawing Sheets

FIG. 4

EDGE-BASED CLOUD APPLICATION ACCELERATION

BACKGROUND

Performance is oftentimes a factor in the success of a cloud-based application or service. Quality of Service (QoS) performance metrics (e.g., throughput, delay, delay variation, packet loss) that provide for a satisfactory Quality of Experience (QoE) for end users can be negatively affected by factors such as bandwidth constraints and increased data transmissions. For example, time-sensitive applications or services can require low or near real-time latencies and application processing for successful performance (e.g., autonomous functions, augmented and virtual reality applications, video conferencing, security functions). In an Internet of Things (IoT) environment, IoT devices and applications can be sources of big data. For example, IoT can entail gathering, transmitting, and processing vast amounts of data, most of which is likely generated at a network edge. In a centralized network architecture where large numbers of clients distributed throughout a vast network rely on a remote centralized compute resource, bandwidth and network speed limitations can render an application unusable. A centralized network architecture may not feasibly support the increasing number of time-sensitive applications and services that rely on low or near real-time latencies.

In an effort to improve the performance, operating cost, and reliability of online applications and services, providers of those applications and services, as well as providers of the network services connecting clients to the applications and services, may wish to shorten the distance between clients and the cloud resources that serve them. For example, in a decentralized, edge computing model, latency and bandwidth constraints can be mitigated by using virtualized network functions (VNFs) (i.e., software implementations of cloud resource functions) deployed on network resources on the edge of a network and thus closer to clients where additional network hops can be avoided. That is, a set of services that process data (e.g., latency-sensitive data) can be placed proximate to a client, where travel time can be reduced and where processing can be performed closer to the client.

Edge computing affords many advantages, such as increased speed, process optimization, and outage reduction. Nonetheless, a lack of an electronic platform for enabling one or more edge resource providers to expose available edge resources to third party online services providers presents a challenge to third party online services providers that prevents widespread adoption of utilizing such edge resources for edge computing functionalities. A solution is needed to provide offerings of available edge resources to third-party online services providers while simplifying the process of deploying service functionalities on a network edge based on demand.

SUMMARY

Aspects of a computer-implemented system and method and a computer-readable storage device are disclosed for providing an edge resource marketplace that exposes available edge computing resources to third parties for enabling a third party to select and deploy microservices on those available edge computing resources when and where they are needed. According to aspects, the edge resource marketplace provides a platform that is configured to receive data from one or more sources or providers of edge computing resources about edge computing resources that are available for provisioning to third parties, receive criteria and other selections made by a third party as part of a search for available edge computing resources, determine and provide a listing of one or more available edge computing resources that are optimized for the third party, receive a selection of an edge computing resource, and provide a portal for enabling transmission of a configuration file to the resource provider for deployment of a virtual network function (VNF) for performing a third-party microservice functionality proximate to one or a group of customers of the third-party online services provider for a requested time period. For example, aspects of the edge resource marketplace system provide a platform that enables third parties to dynamically allocate and deploy a set of microservices on an edge computing resource owned and/or operated by another entity. As described above, a third party may wish to instantiate a set of microservices on an edge computing resource proximate to one or a group of clients for increasing the efficiency and functionality of the set of microservices.

According to aspects, an instance of a data or compute service can be offloaded and dynamically deployed as a VNF (Virtualized Network Function) at a strategic location at a network edge, for example, for reducing latency and improving application/service performance. As can be appreciated, distribution of heavy processing onto an edge computing resource can be advantageous for on-demand customization and processing (e.g., dynamic video editing). The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIG. 4 is an illustration of an example user interface provided by the edge resource marketplace;

DETAILED DESCRIPTION

Aspects of the present disclosure provide an edge resource marketplace that enables third parties to selectively deploy microservices on an edge network on-demand. For example, an edge computing resource provider can utilize the edge resource marketplace to expose available edge computing resources to third party services (application) providers, and third party services providers can utilize the edge resource marketplace for discovering, determining, and purchasing usage of one or more optimal available edge computing resources for on-demand deployment of a set of microservices proximate to end users for reduced latency and improved application performance.

Figure 1:
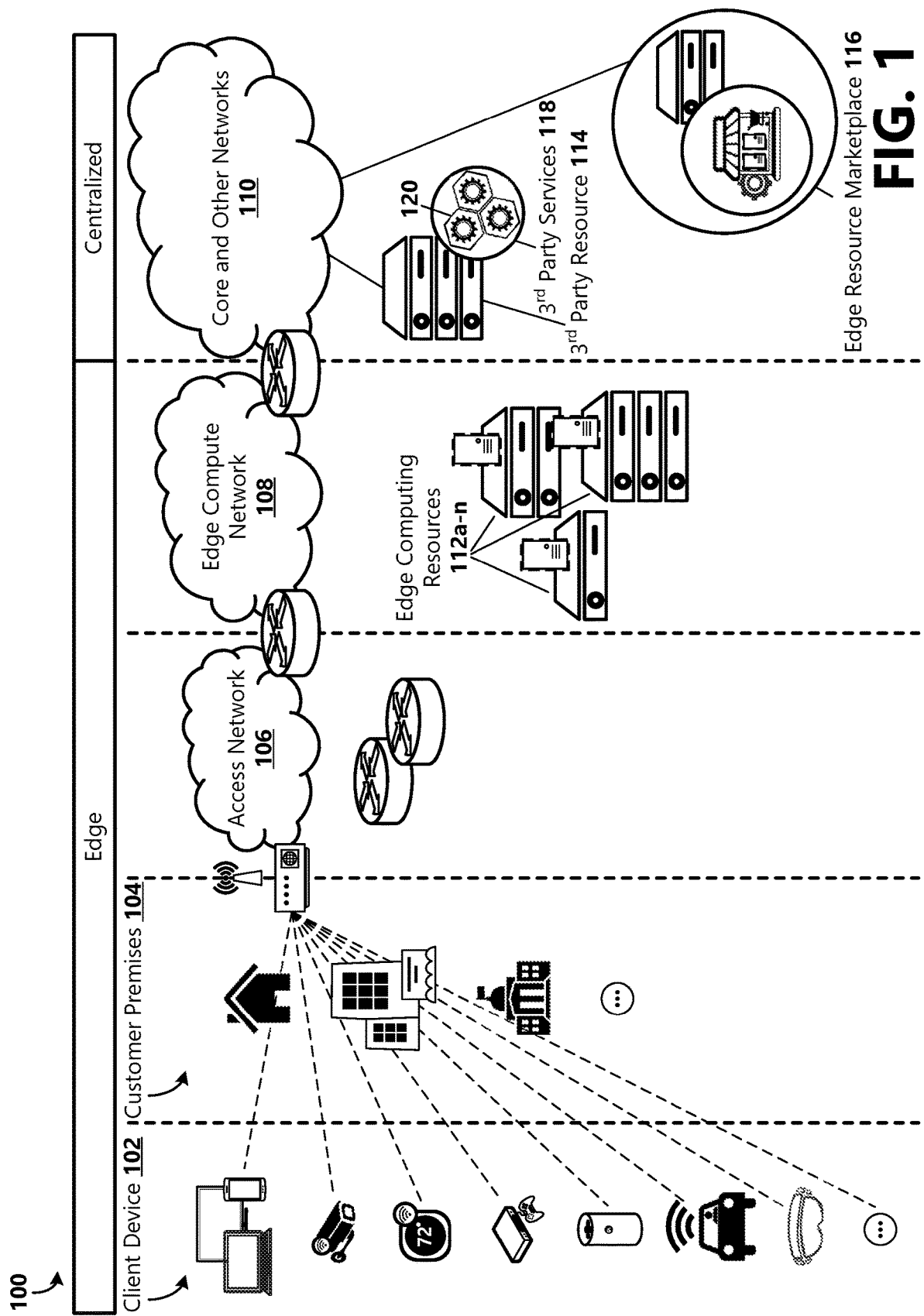
FIG. 1 is a block diagram of an example environment in which a system can be implemented for providing an edge resource marketplace according to an embodiment.

FIG. 1 is a block diagram of an example operating environment 100 in which an edge resource marketplace 116 can be implemented. The edge resource marketplace 116 allows a provider or supplier of edge resources to share, sell, or otherwise offer provisioning and allocation of edge-based computing resources (referred to herein as edge computing resources 112a-n, generally 112) to third-party providers of online services/applications. According to an aspect, edge computing resources (ECRs) 112 are virtual computing environments comprised of configurations of computing resources (e.g., central processing unit (CPU), memory, storage, and bandwidth) hosted by one or more physical resources (e.g., data centers, commercial off-the-shelf (COTS) servers, switches, storage devices, or other cloud computing infrastructure) at an edge of a network system that are configurable to run sets of services or microservices. A third-party online services provider can utilize the edge resource marketplace 116 to dynamically request allocation of ECRs 112 for deployment of a virtual network function (VNF) for performing a third-party microservice functionality proximate to one or a group of customers of the third-party online services provider. For example, a third party (online services provider) is enabled to access the edge resource marketplace 116 to purchase allocation of an ECR 112 for a specified time based on the third party's needs.

The third-party online services provider can be one of various types of providers of online services (i.e., third-party services 118) for offer to customers over a network or a combination of networks (e.g., an access network 106, an edge compute network 108, the internet core and other networks 110). Such networks can include the Internet, an intranet, an extranet, local-area networks, wide-area networks, fiber-coax networks, public switched telephone networks, global telephone networks, wired networks, wireless networks, and combinations thereof. Oftentimes, third-party service providers provide third-party services 118 to customers for a fee. An example third-party online services provider can include a video doorbell service provider that provides network-based video doorbell services (third-party services 118) in the form of providing video streaming, two-way audio communication, remote control of connected devices, etc., over a network. Other example third-party services 118 can include autonomous services, intelligent decision making services, video surveillance (e.g., video analytics, optimization applications), gaming services, critical healthcare monitoring services, content creation services (e.g., virtual reality services, augmented reality services), IoT data analytics services, etc.

In various examples, such third-party services 118 are configured to provide real-time or near real-time online services that are reliant on fast data transfer speeds (e.g., low or ultra-low latencies) to provide quality services. Provision of such services can entail gathering, transmitting, and processing vast amounts of data. According to an aspect, this data may be generated at a network edge via client devices 102 at customer premises 104 (e.g., a home, an enterprise, a public building or area, a municipality), and may be directed to a third-party resource 114 configured to perform functionalities associated with providing the third-party services 118. The third-party resource 114 can be implemented as a single computing device (e.g., server device) or as a plurality of computing devices cooperating in a distributed environment. In various examples, the third-party resource 114 may be part of a centralized network, where most or all of the processing/computing associated with provision of the third-party services 118 is performed at a central server. For example, the third-party resource 114 (as part of providing third-party services 118 to customers) may be responsible for delivering processed data, application logic, processing, and/or other computing resources to communicatively attached client devices 102. According to an aspect, the third-party services 118 are comprised of a plurality of microservices 120a-n (generally 120). The third-party microservices 120 may be independently deployable services, each configured to provide a certain task, functionality, or fine-grained clearly scoped services, and can be configured to communicate through programmatic interfaces (e.g., application programming interfaces (APIs)).

Example client devices 102 can include a desktop computer, a tablet device, a mobile phone, a set-top box, a gaming console, a smart object, a dedicated digital media player, a speaker device, a wearable device, a home security and monitoring device, an Internet of Things (IoT) device, a Cyber-Physical Systems (CPS) device, etc. In examples, a client device 102 can be communicatively connected to a router, network switch, residential gateway (RG), fixed mobile convergence product, home networking adapter, or an Internet access gateway that enables customers to access service providers' services and distribute them around the customer's premises via a local area network (LAN). Details of computing devices and variations thereof can be found in FIGS. 6, 7A, and 7B.

Figure 2:
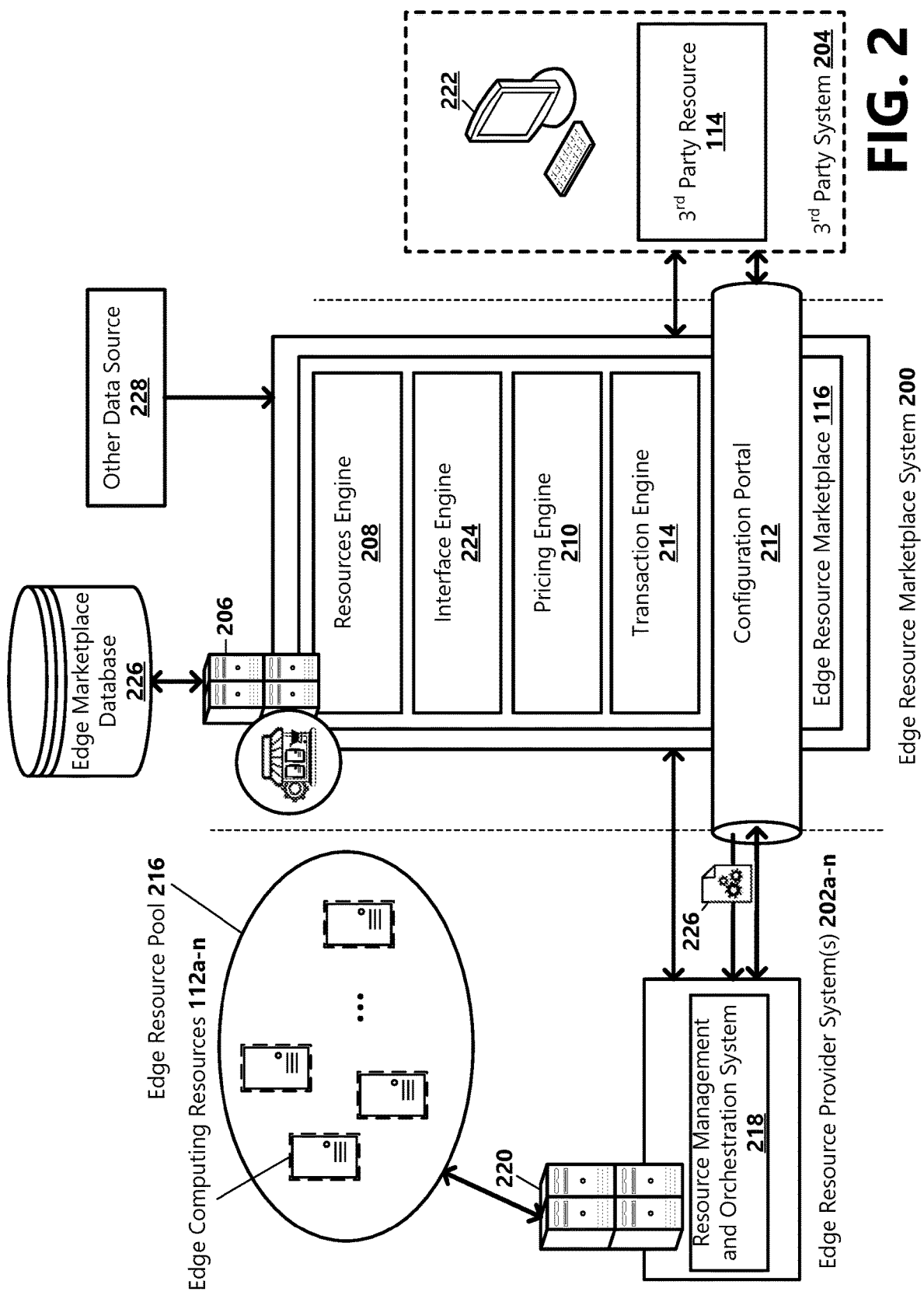
FIG. 2 is a block diagram various components of an example edge resource marketplace system.

With reference now to FIG. 2, a block diagram is illustrated that shows various components of an example edge resource marketplace system 200. In one example, the edge resource marketplace 116 is configured to execute on at least one processor of a marketplace server 206. In another example, the edge resource marketplace 116 is configured to execute on a plurality of computing devices cooperating in a distributed environment. According to an aspect, the edge resource marketplace 116 comprises a resources engine 208, a pricing engine 210, a transaction engine 214, and an edge resource marketplace database 226 configured to provide one or more functions of the edge resource marketplace. The edge resource marketplace 116 is configured to provide a listing of available ECRs 112 offered by one or more ECR provider systems 202a-n (generally 202) onto which a third-party system 204 can deploy a set of third-party microservices 120. For example, a listing of available ECRs 112 includes a searchable listing of available configurations of resources (CPU, memory, storage, and network capacity). According to an aspect, ECRs 112 may be categorized by an ECR type, wherein ECRs of a particular ECR type are determined to be optimized for a particular application type (e.g., general, compute/performance, memory, storage). For example, an ECR 112 categorized as a compute/performance-optimized resource may be configured to provide cost-effective high I/O and network performance (e.g., high packet per second (PPS) performance, low network jitter, and low latencies) and high compute power in support of compute-intensive applications (microservices 120). Other ECR types are possible and are within the scope of the present disclosure. According to an aspect, the one or more ECR provider systems 202 are enabled to use the edge resource marketplace 116 to offer usage of various available resource configurations (ECRs) 112 to third parties for a fee. For example, third party may pay an ECR provider for usage of an ECR 112 for an amount per second, per hour, per week, per month, yearly, etc.

Figure 3:
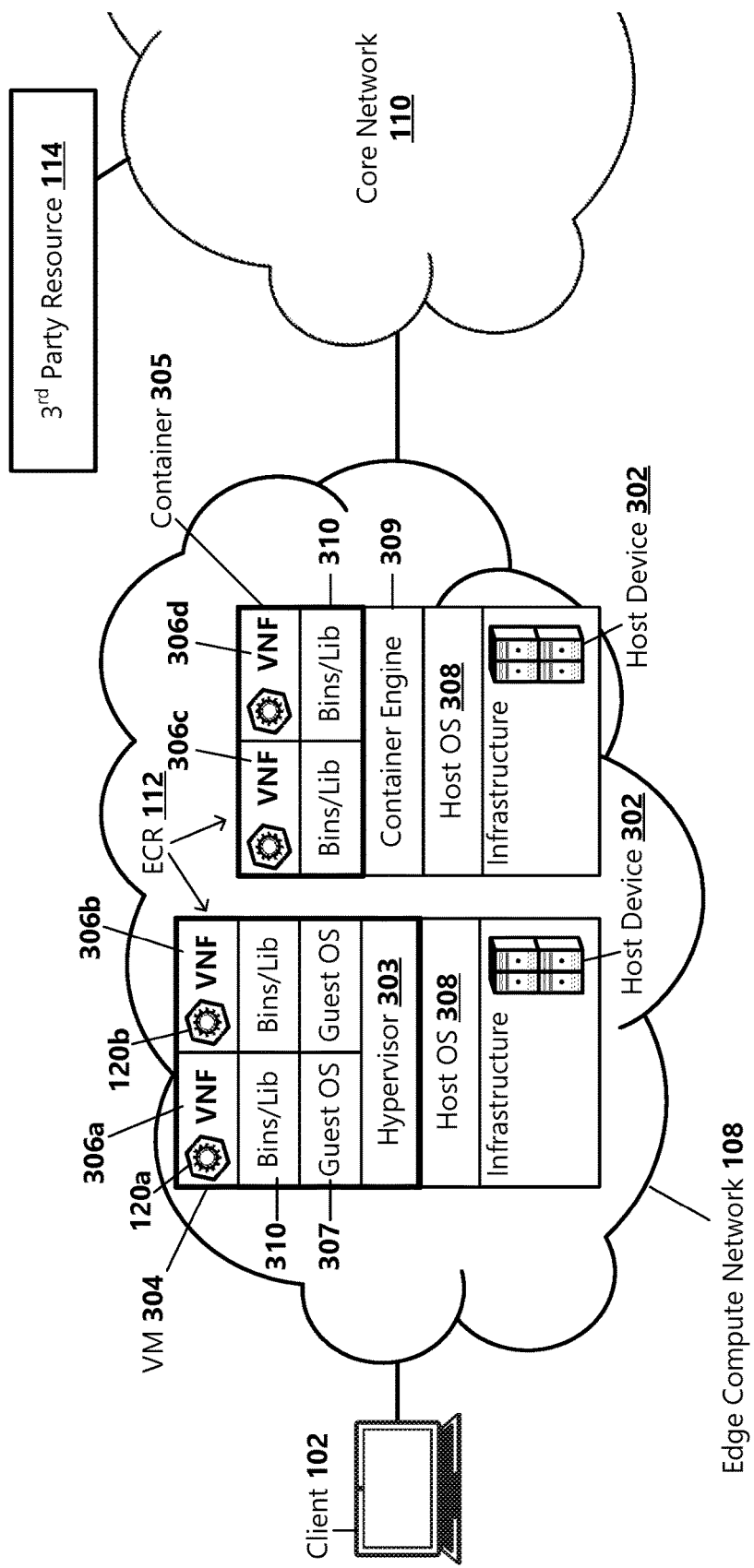
FIG. 3 is a block diagram of an edge computing resource on an edge compute network.

In various examples, ECRs 112 can be configured as virtual machines (VMs), containers, or executable code. With reference to FIG. 3, an example of an ECR 112 configured as a VM 304 and an example of an ECR configured as a container 305 are illustrated. For example, a VM 304 is an emulation of a computer system, wherein guest operating systems (OSs) 307 and their applications (microservices 120a,b) share hardware resources of a single host device 302 (e.g., commercial off-the-shelf (COTS) server, switch, storage device, or other cloud computing infrastructure) or from a pool of host devices. In various implementations, the host computing device 302 can be implemented in an access network 106, at a customer's premises 104, or in another network.

An ECR configured as a VM 304 includes a dedicated OS (host OS 308) and a hypervisor 303 illustrative of software, firmware, or hardware that creates and runs \Ails 304. The host OS 308 and the hypervisor 303 enable virtualization to run third-party microservices 120 in an environment separated from its underlying hardware and layer of abstraction, wherein this abstraction enables host devices 302 to be partitioned into VMs 304 that can run separate guest OSs 307. Alternatively, containers 305 sit on top of a physical host device 302 and its host OS 308. Each container 305 is configured to share the host OS kernel and, usually, also the binaries and libraries 310, wherein shared components are read-only. Sharing OS resources reduces the need to reproduce the operating system code (guest OS 307), enabling a host device 302 to run multiple workloads (microservices 120) with a single operating system installation. According to an aspect, containers 305 can be light in size and can be started in seconds, which can be advantageous for a third party in that it enables the third party to quickly and efficiently scale up or down computing resources to handle changes in requirements.

With reference again to FIG. 2, the edge resource marketplace 116 is in communication with one or more ECR provider systems 202a-n (generally 202), which are configured to access the edge resource marketplace for offering available ECRs 112 to third parties. In one example, the edge resource marketplace 116 is operated by a particular ECR provider system 202 that offers its ECRs 112 to third party systems 204. In another example, the edge resource marketplace 116 is operated by a particular ECR provider system 202 that offers its ECRs 112 and other ECR provider systems' ECRs to third party systems 204. In another example, the edge resource marketplace 116 is a separate system that operates as an intermediary between ECR provider systems 202 and third party systems 204.

According to an aspect, the edge resource marketplace 116 includes a resources engine 208 illustrative of a software application, module, or computing device operable or configured to receive or retrieve (or otherwise obtain) ECR data from one or more ECR provider systems 202, wherein the ECR data includes information about the various ECRs 112 that are available for allocation to third party systems 204. For example, ECR data includes descriptive information about each ECR that a third party can evaluate for determining whether a particular ECR 112 satisfies conditions associated with performing a set of third-party microservices functionalities. According to an aspect, ECR data provided by an ECR provider system 202 includes a variety of information associated with an ECR 112, such as but not limited to: an ECR name, OS type, CPU availability, memory availability, storage space availability, network bandwidth availability (e.g., upload capacity, download capacity), network performance, location information, and pricing information. For example, location information can include a physical location of the physical resource or host device 302 of an ECR 112, a service range and associated service metrics, etc. In various examples, ECR data provided by an ECR provider system 202 to the edge resource marketplace 116 further includes resource availability information (e.g., information that indicates dates and times of availability or of unavailability). As should be appreciated, this list is not exhaustive. Additional (or less) information can be included in the ECR data and is within the scope of the disclosure.

In various examples, pricing data is used by a pricing engine 210 in determining a value or price associated with usage or reservation of an ECR 112. That is, the pricing engine 210 determines a price for a third party to pay for allocation of ECR resources (e.g., per second, per hour, for a specified time period) for running a third-party task, functionality, or other fine-grained scoped service (i.e., a third-party microservices 120). According to an aspect, determining a price for utilization of an ECR 112 can be based on various factors, such as location, date, time, ECR provider, ECR type, length of use, amount of data transferred, number of ECRs used, supply and demand, network performance data, etc. For example, pricing data associated with an ECR 112 provided to the edge resource marketplace 116 by an ECR provider system 202 can include information that enables the pricing engine 210 to determine a price for utilization of the ECR based on one or a combination of the various factors.

In some implementations, the pricing engine 210 is implemented at an ECR provider system 202 for determining a price for that ECR provider system's resources, and that price is provided to the edge resource marketplace 116. For example, an ECR provider system-based pricing engine 210 may include an interface (e.g., an API) for enabling the edge resource marketplace 116 to make a call to the pricing engine to determine a price for an ECR resource 112.

In some examples, ECR data is provided by an ECR provider system 202 proactively. For example, the ECR provider system 202 may continually or recurrently send updated information to the edge resource marketplace 116, wherein the updated information includes an inventory or listing of available ECRs 112 and associated information (ECR data). The resources engine 208 is configured to receive this data file and, in various implementations, the resources engine is further configured to store the received information in the edge marketplace database 226 or to update the edge marketplace database with the received information. The edge marketplace database 226 may be integrated with the marketplace server 206 or communicatively coupled to the marketplace server.

In other examples, ECR data is provided by an ECR provider system 202 responsive to a request by the edge resource marketplace 116 for updated inventory or listing of available ECRs 112 and associated information. In some examples, the edge resource marketplace 116 is configured to request for ECR data from an ECR provider system 202 responsive to a third-party request or query for available ECRs 112. For example, responsive to receiving a third-party request or query for available ECRs 112 or for ECRs that meet certain requirements, the edge resource marketplace 116 (via the resources engine) is configured to submit a request or query to the one or more edge resource provider systems 202 for updated ECR data (e.g., a listing of available ECRs 112 and associated information).

ECRs 112 that an ECR provider system 202 may have available for offering to third-party systems 204 can include various ECRs in an ECR provider system's edge resource pool 216. An example of an ECR provider system 202 can include an Internet Service Provider (ISP) system or other type of network infrastructure provider. In various implementations, the edge resource pool 216 is ECR provider-specific and is maintained by each ECR provider system 202. For example, a plurality of ECR provider systems 202 may have ECRs 112 that each provider system wants to make available to offer to third parties via the edge resource marketplace 116, and each ECR provider system may comprise and maintain its own edge resource pool 216. In some implementations, the edge resource pool 216 includes ECRs 112 of a plurality of ECR provider systems 202. For example, an intermediary system may be operable or configured to gather resources (ECRs 112) from one or more ECR providers and broker the resources to third parties for deploying microservices 120.

According to an aspect, the edge resource marketplace 116 is configured to be accessed by a third-party computing device 222, such as via a web browser application running on the computing device, through a specific client application interface, or via an API. For example, the edge resource marketplace 116 is configured to provide an online marketplace interface where a third-party computing device 222 (or a user of a third-party computing device) can search for available ECRs 112 that meet the third party's VNF placement and service requirements (e.g., compute properties, link properties, location, price, date and time availability), and to obtain (e.g., rent) an ECR within a minimal amount of time (e.g., minutes) as needed.

For example, a third party may want to rent/utilize an ECR 112 located in a network proximate to particular clients 102 to run a set of microservices 120, where data transmissions to the ECR 112 can avoid additional network hops that would otherwise be involved in transmitting data to a centralized resource (e.g., third-party resource 114) on the core network or other networks 110. Accordingly, a third-party system 204 that provides services (i.e., third-party services 118) to clients 102 can benefit from virtualizing a set of microservices 120 on an ECR 112 on a particular edge compute network 108 proximate to a particular client or subset of clients. For example, a set of third-party microservices 120 can be placed on resources proximate to a client 102, where travel time can be reduced and where processing can be performed closer to the client. Advantageously, latency-sensitive and/or heavy processing functionalities can be offloaded from third-party resources 114 and distributed, which is particularly useful for on-demand customization and processing (e.g., dynamic video editing). Additionally, virtualization can reduce costs for a third party system 204 by reducing the need for physical hardware systems. VMs 304 and containers 305 use hardware more efficiently, which can lower the number of hardware systems and associated maintenance costs, and can further reduce power and cooling demand. A third-party system 204 can benefit from use of the edge resource marketplace 116 to quickly and easily discover, purchase, and dynamically move service provisioning to the network edge (e.g., to deploy sets of third-party microservices 120 onto for optimizing a service-path between a client 102 and the services provided by the third party).

In various implementations, the edge resource marketplace 116 comprises an interface engine 224 illustrative of a software application, module, or computing device operable or configured to generate a user interface (UI) via which a third-party user (via the third-party computing device 222) is enabled to search for available ECRs 112, submit a query for ECRs that meet certain criteria, view characteristics and pricing information associated with specific ECRs, and select one or more ECRs for deploying a set of microservices 118 onto for providing a third-party service functionality. In some implementations, a third-party computing device 222 may be configured to automatically submit queries for ECRs 112 that meet certain criteria (e.g., ECR type, location, compute, storage, and network capacities, network performance, price) and automatically select one or more ECRs via based on business rules.

According to an aspect, the UI generated by the interface engine 224 can include a searchable and filterable listing of available ECRs 112. For example, the UI can include a search field for specifying search criteria and/or selectable options for filtering the listing based on the third party's needs/use case associated with running a particular set of microservices 120. According to examples, the listing can be filtered/searched by one or a combination of: location (e.g., geographic location, zone, region, state, country), ECR type, CPU, memory, storage, network performance, cost, availability (e.g., date, time, duration of consumption), data transfer capacity, type of host OS 308, ECR provider, rating, use case, fault tolerance, etc. According to an aspect, a third-party user may utilize a third-party computing device 222 to select a combination of criteria for an ECR 112, wherein the list can be filtered to include ECRs 112 meeting the selected criteria, or the third-party criteria selections are communicated to the edge resource marketplace 116 where the query request is received and the criteria selections are used as parameters in a query for available ECRs 112 meeting the selected criteria.

In some implementations, the UI generated by the interface engine 224 includes one or more selectable options for enabling a third-party user (via a third-party computing device 222) to select one or more strategic objectives or desired target results for usage of an ECR 112. For example, a selection can be made by a third party to determine available ECRs 112 that may provide optimal bandwidth, that provide the lowest latency, that provide the most storage capacity, that are configured to support compute-intensive applications, etc. In some examples, the one or more selectable options include various use cases, wherein based on a selection of a particular use case, the listing of ECRs 112 is updated based on ECRs that are optimized for the selected use case. For example, if a selection is made of an autonomous vehicle application, the listing is updated with ECRs 112 that are configured with accelerated computing capabilities Selections made by the third party are communicated, via the interface engine 224, to the resources engine 208, where a query can be made for available ECRs 112 and a determination can be made as to which available ECRs are optimized for the third party according to the selected strategic objectives or desired target results options.

In various implementations, the resources engine 208 is configured to query the edge resource marketplace database 226 for available ECRs 112. In some implementations, responsive to receiving third-party selections or a query request from a third-party, the resources engine 208 is configured to submit requests to one or more ECR provider systems 202 for current ECR 112 inventory availability. Or, the resources engine may submit a request to one or more ECR provider systems for available ECRs that satisfy the third-party selections. In various examples, this request is communicated via an API.

In various implementations, the resources engine 208 is configured to identify available ECRs that satisfy the third-party selected criteria and then apply an optimization algorithm to the results for determining one or more ECRs 112 that optimize compute and network cost with respect to performance. In some examples, the optimization algorithm is applied to determine one or more ECRs 112 that are optimized for the third party based on a selected ECR type and/or strategic objective option made by the third party. According to an aspect, the determination of the one or more ECRs 112 that are optimized for the third party can be based on network topology data (e.g., provided by a data source 228), ECR data (e.g., provided by the one or more ECR provider systems 202), and selections made by the third party. The data source 228 may embodied as an ECR provider network topology data source, a third-party network topology data source, or another network topology data source. For example, the resources engine 208 is configured to receive network topology data from the network topology data source as part determining whether a particular ECR 112 is optimized for a third party (e.g., an ECR that satisfies the criteria specified by the third party and that can enable the third party to meet its strategic objectives or desired target results).

In some implementations, the resources engine 208 is further configured to communicate with the pricing engine 210 for determining a value or price associated with an ECR 112 based on various factors and attributes of the ECR. According to an aspect, the pricing engine 210 is illustrative of a software application, module, or computing device operable or configured to determine a value or price associated with acquisition and utilization of an ECR 112 for providing resources in support of providing a third-party microservice 120 to service a client 102 or a set of clients. In some implementations, the pricing engine 210 is a separate system and is configured to communicate with other components of the edge resource marketplace 116 via a programming interface (e.g., API) for providing a price for ECR consumption.

Various factors and attributes may be used to determine a price (e.g., per second, per hour, per month, per year, per amount of data traffic) for consumption of an ECR 112, such as location, type/amount of compute resources, date of consumption, time of consumption, duration of consumption, guaranteed ECR performance metrics (e.g., latency, bandwidth), supply and demand, ECR provider, etc. In some implementations, a price can be determined and provided for different placement options. According to an example, the determination of the price can be based on network topology data (e.g., provided by a data source 228), ECR data (e.g., provided by the one or more ECR provider systems 202), the ECR provider, and selections made by the third party. For example, the pricing engine 210 is configured to receive network topology data from the network topology data source as part determining a price for consumption of an ECR 112.

According to an aspect, results are provided to the interface engine 224, which is configured to update the UI to include a listing of one or more available ECRs 112 that satisfy the third party's criteria. In various implementations, the UI is updated to include a listing of one or more optimized ECRs based on based on strategic objective option selections (e.g., optimal bandwidth, lowest latency, most storage capacity) made by the third party. According to an aspect, the UI is configured such that a third-party user is enabled to adjust the one or more selected strategic objective options, which causes the UI to update the listing of the one or more optimized ECRs based on the user's selections.

According to an aspect, a third-party user (via a third-party computing device 222) is enabled to select one or more ECRs 112 from the listing for initiating a transaction between the third party and the provider of the selected ECR(s), where the third party agrees to pay the provider for usage of the provider's ECR(s) for deployment of one or more third-party microservices 120. The third-party user may be prompted for other information associated with an ECR selection, such as dates, duration, etc. Responsive to a selection of an ECR 112, the selection and associated information is communicated to the edge resource marketplace 116, and the transaction engine 214 provides the third party with access to a transaction interface. For example, the transaction engine 214 provides an interface for allowing the third party to provide payment or billing information to a provider of the selected ECR 112 for utilization of the selected ECR, wherein the price of utilization may be based on the value or price determined by the pricing engine 210.

In some implementations, the transaction interface is incorporated into the edge resource marketplace 116, where transaction processing functionalities in association with an ECR transaction are executed by the transaction engine 214. In other implementations, the transaction engine 214 is configured to communicate with a separate payments transaction system (or with the ECR provider system 202) via a set of API calls that enable users to complete a payment transaction or to agree to an arrangement for payment.

According to an aspect, responsive to this completion of a payment transaction or to the agreement of an arrangement for payment, the edge resource marketplace 116 is further configured to provide a configuration portal 212 for enabling the ECR provider system 202 of a selected/purchased ECR 112 to receive a data file 226 for enabling deployment of a set of third-party microservices 120 on the selected optimized ECR. In various implementations, the configuration portal 212 is an API. As an example, the data file 226 can include a configuration file associated with a set of third-party microservices 120 that is used to deploy the set of third-party microservices on the selected ECR 112, wherein the configuration file can include the set of third-party application (microservices 120), libraries 310, data, and associated configuration settings. In various implementations, the ECR provider system 202 comprises a resource management and orchestration system 218 configured to onboard and deploy a VNF 306 into production per requirements of the set of third-party microservices 120. In various examples, the resource management and orchestration system 218 includes one or more of: a resource (e.g., VNF) manager, a virtualized infrastructure manager, and a network function virtualization (NFV) orchestrator.

Aspects of the edge resource marketplace system 200 provides a platform that enables third parties to dynamically allocate and deploy a set of microservices 120 on an ECR 112 owned and/or operated by a disparate ECR provider for a requested time period. As described above, a third party may wish to instantiate a set of microservices 120 on an ECR 112 proximate to one or a group of clients for increasing the efficiency and functionality of the set of microservices. For example, a third party may want to place a lightweight piece of executable code at the edge (e.g., on an edge network 108) to process a high volume of data and/or data that may be most subject to degradation due to network issues. According an aspect, when an ECR provider system 202 has previously onboarded a particular set of microservices 120 on an ECR 112, the ECR provider system 202 of the ECR can re-instantiate the set of microservices on the ECR on-demand. In various examples, a third party is enabled to deploy the set of microservices 120 during a particular session between a client device 102 and a third-party resource 114. For example, the third party may dynamically offload latency-sensitive and/or heavy processing functionalities from third-party resources 114 and distributed them onto one or more ECRs 112, which is particularly useful for on-demand customization and processing (e.g., dynamic video editing). That is, VNFs 306 can be created (i.e., deployed and transitioned into a state such that they are configured to perform sets of third-party microservices 120 functionalities) and deleted as the demand for them changes. According to examples, a VNF instance of a third-party microservice 120 can be deployed during a client session with the third-party resource, and traffic can be re-directed to the VNF instance during the session for performing the third-party service functionality as part of the client session.

In various implementations, the resources engine 208 is further configured to determine or forecast a demand for additional resources in a network for meeting third parties' needs and for maximizing revenue. For example, the resources engine 208 is configured to determine a forecasted demand for ECRs 112 in various locations based on one or a combination of actual purchase data associated with third-party purchases of ECRs 112, price data, data associated with queries for ECRs (e.g., location, dates, times, compute capabilities), and network topology data. That is, an ECR provider can use the resources engine 208 to determine whether a forecasted demand for a particular type of ECR 112 at a particular location satisfies criteria that support the expenditure of costs associated with configuring additional ECRs and, in some examples, building infrastructure (e.g., installing a new hardware-based host device 302 in a network). Determination results can be provided to the ECR provider system 202 responsive to a request for the determination results, wherein determination results can include a listing of recommended locations where additional resources (and types of resources) can be implemented for satisfying forecasted third-party ECR demands.

Figure 4:
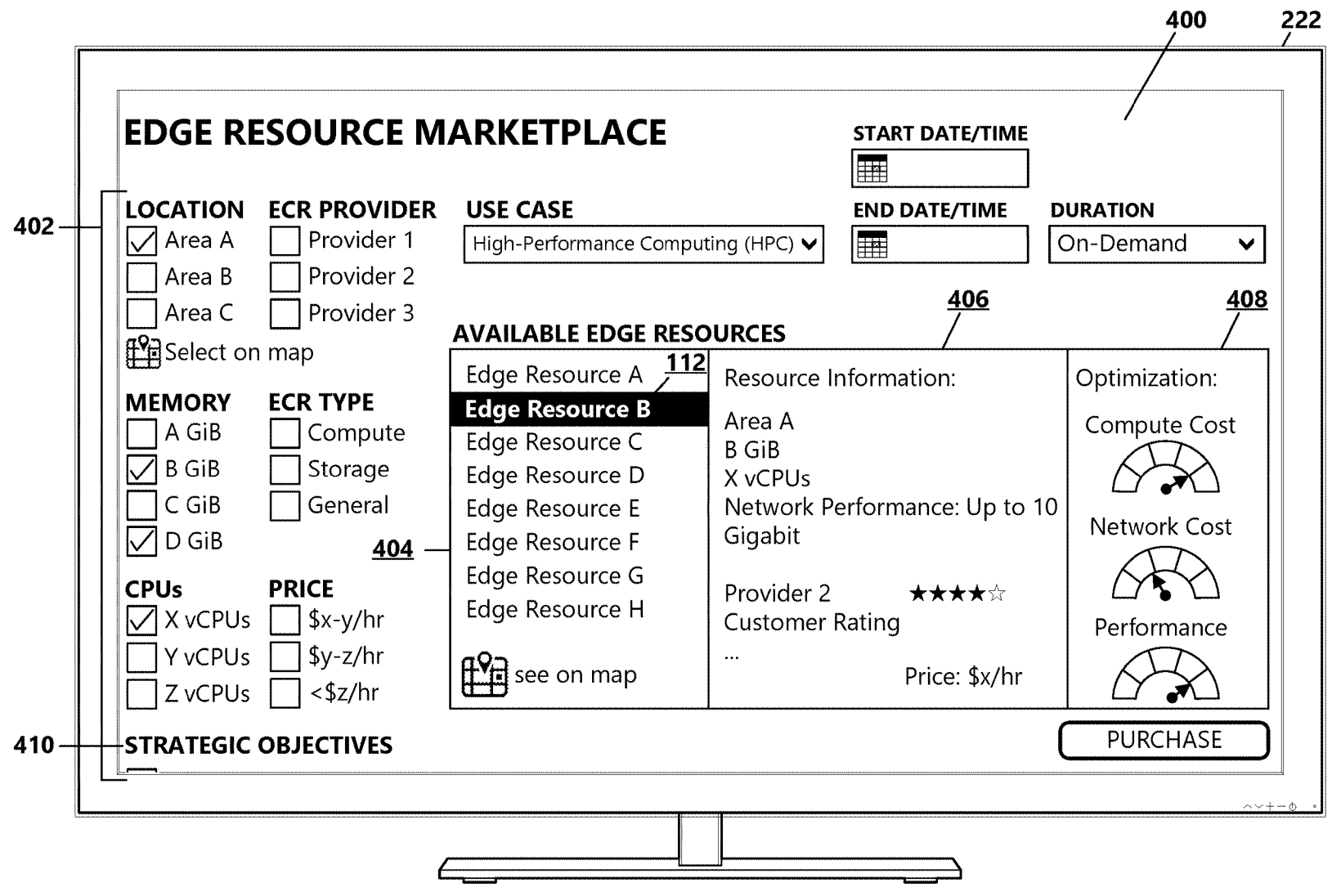

FIG. 4 is an illustration of an example UI 400, such as a UI that can be generated by the interface engine 224 and provided for enabling a user of a third-party computing device 222 to select various criteria 402 for specifying the third party's ECR requirements and/or strategic objective option selections, to view a listing 404 of one or more available ECRs 112 that satisfy the third party's criteria (and additional information 406 about the resources), and to select one or more ECRs from the listing and initiate a transaction between the third party and the provider of the selected ECR(s) for usage of the provider's ECR(s) for deployment of one or more third-party microservices 120. In various examples, the UI 400 includes a UI element that provides an indication of levels at which a particular ECR 112 meets one or more of the third-party's specified strategic objectives 410 (e.g., optimal bandwidth, lowest latency, most storage capacity), wherein the levels are associated with a score indicating a level of satisfaction of the one or more strategic objectives based on one or more attributes of the optimized edge computing resource. In some examples, the UI 400 includes a UI element 408 that provides an indication of determined or calculated optimization metrics (e.g., compute cost, network cost, performance). As should be appreciated, the example UI 400 is just one example of a UI; other types and designs of UIs are possible and are within the scope of the present disclosure, and more or less information, as well as different UI components can be provided in the UI.

Figure 5:
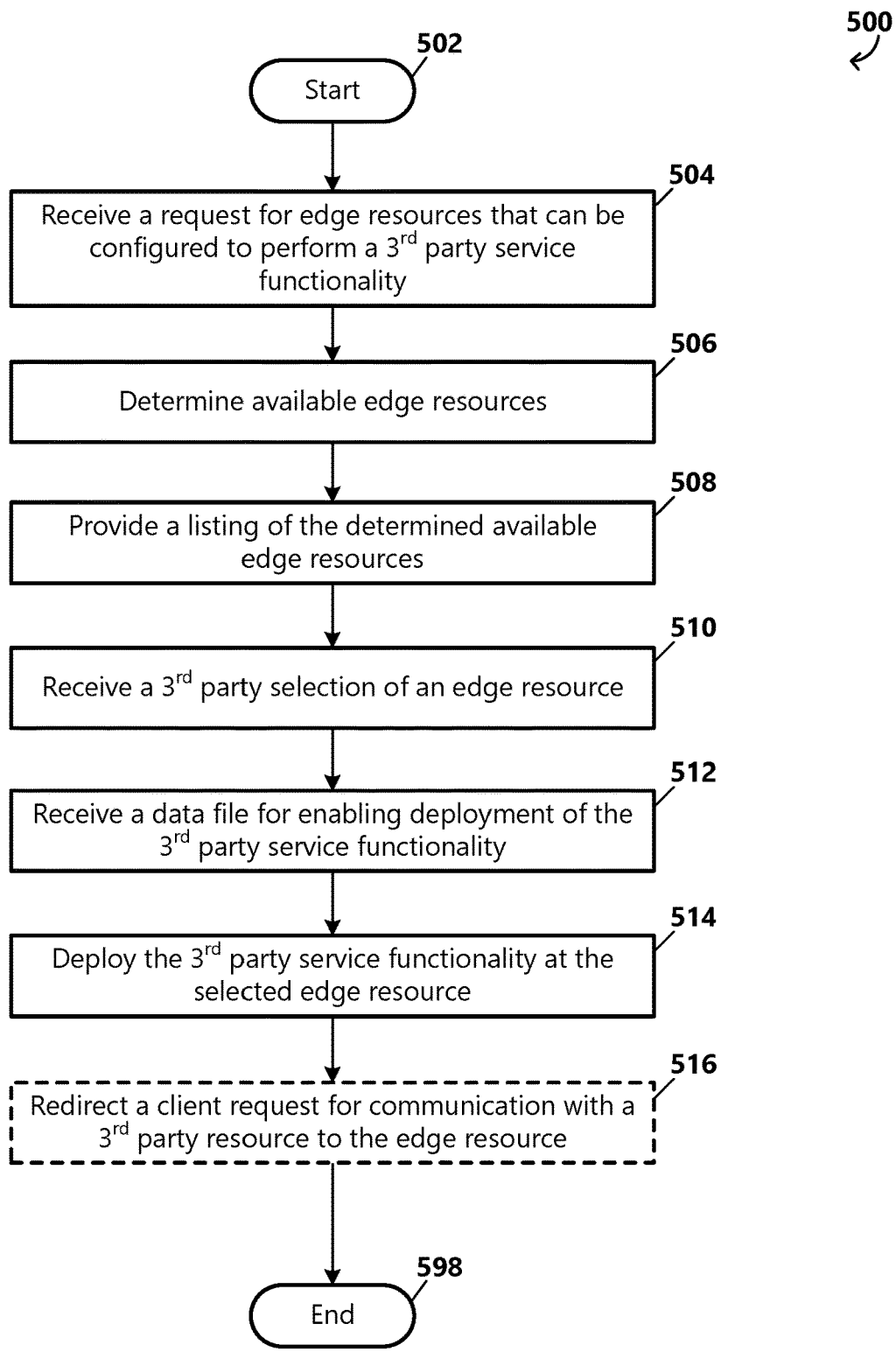
FIG. 5 is a flow diagram depicting general stages of an example process for providing an edge resource marketplace according to an embodiment.

FIG. 5 is a flow diagram that depicts general stages of an example method 500 for providing an edge resource marketplace 116 according to an embodiment. The method 500 starts at OPERATION 502, and proceeds to OPERATION 504, where a UI 400 is provided for enabling a user of a third-party computing device 222 to select various criteria 402 for specifying the third party's ECR requirements and/or strategic objective option selections. For example, a third-party user is enabled to access the edge resource marketplace 116 via an interface for determining one or more available ECRs that the third-party can utilize for deploying one or more third-party microservices 120. According to aspects, a UI 400 can be provided that includes various options that can be selected by a user for specifying characteristics that the third party desires/needs for implementation of the third-party microservices 120 on a resource on an edge compute network 108.

At OPERATION 506, the request is received by the edge resource marketplace 116. At OPERATION 506, the method 500 uses the resources engine 208 to query the edge marketplace database 226 and/or one or more ECR provider systems 202 for available ECRs 112 based on selections made by the user. In various implementations, the method 500 uses the pricing engine 210 as part of determining a price for utilization of available ECRs 112. In various implementations, the method 500 uses the resources engine 208 as part of determining one or more optimized ECRs 112 for the third party. For example, based on network topology data and criteria provided by the third-party user and, if provided, based on the third-party's specified strategic objectives 410 (e.g., optimal bandwidth, lowest latency, most storage capacity), the resources engine 208 can determine one or more ECRs 112 that best satisfy the criteria and strategic objectives of the third party.

At OPERATION 510, the method 500 uses the interface engine 224 as part of providing a listing of the determined available ECRs 112 that are optimized for the third-party to a requesting third-party computing device 222. The method 500 proceeds to OPERATION 512, where the method further uses the interface engine 224 as part of receiving a third-party selection of an ECR 112, wherein the selection is associated with a purchase agreement between the third-party and the ECR provider of the selected ECR for utilization of an ECR 112 for instantiating one or more third-party microservices 120 for provision to clients for a specified time. Further, the method 500 uses the transaction engine 214 as part of providing an interface for allowing the third party to provide billing information or to remit payment to the provider of the selected ECR 112 for utilization of the selected ECR based on the value or price determined by the pricing engine 210.

At OPERATION 512, the method 500 uses the edge resource marketplace 116 as part of providing a configuration portal 212 configured to enable communication between the ECR provider system 202 of the selected/purchased ECR 112 and the third-party computing device 222 of a data file 226 (e.g., a configuration file) including instructions, which when executed by an edge resource manager 218 enable deployment of a set of third-party microservices 120 on the selected ECR.

At OPERATION 514, the method 500 uses the resource management and orchestration system 218 as part of instantiating a VNF instance 306 (e.g., allocating VM 304 resources for the VNF instance), configuring parameters of the VNF instance for enabling the VNF instance to participate in the third-party microservices 120, and activating the VNF instance for triggering it to perform its functionality. According to examples, a location (e.g., IP address) of the VNF instance 306 is communicated to the third-party system 204 such that, at OPERATION 516, the method 500 can use the third-party system to direct or redirect client requests associated with the third-party microservices 120 to the VNF instance during the specified time period that the third-party is utilizing the ECR 112. The method 500 ends at OPERATION 598.

Figure 6:
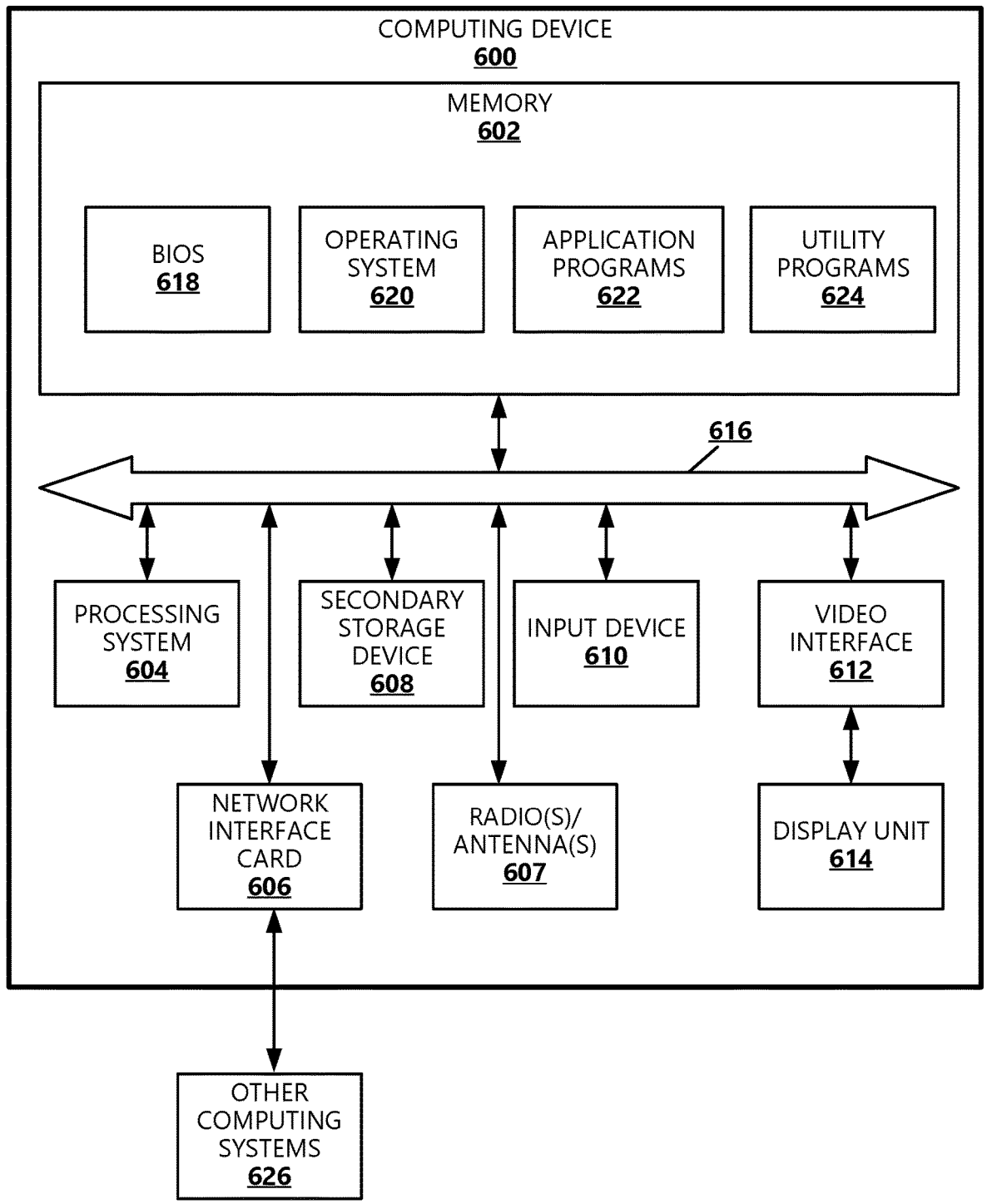
FIG. 6 is a block diagram illustrating example physical components of a computing device or system with which embodiments may be practiced.

FIG. 6 is a block diagram illustrating example physical components of a computing device or system 600 with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 604, memory 602, a network interface 606 (wired and/or wireless), radio/antenna 607, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules 626.

The memory 602 includes one or more computer-readable storage media capable of storing data and/or computer-executable instructions. Memory 602 may store the computer-executable instructions that, when executed by processor 604, provide dynamic, policy-based, and resource assignment protocol-implemented edge-compute resource allocation and traffic direction according to an embodiment. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs or program code 622 that, when executed by the processing system 604, cause the computing device 600 to provide applications to users. According to an embodiment, the memory 602 includes sufficient computer-executable instructions for one or more components of the edge resource marketplace 116, which when executed, perform functionalities as described herein. The memory 602 also stores one or more utility programs 624 that, when executed by the processing system 604, cause the computing device 600 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 7A, 7B:
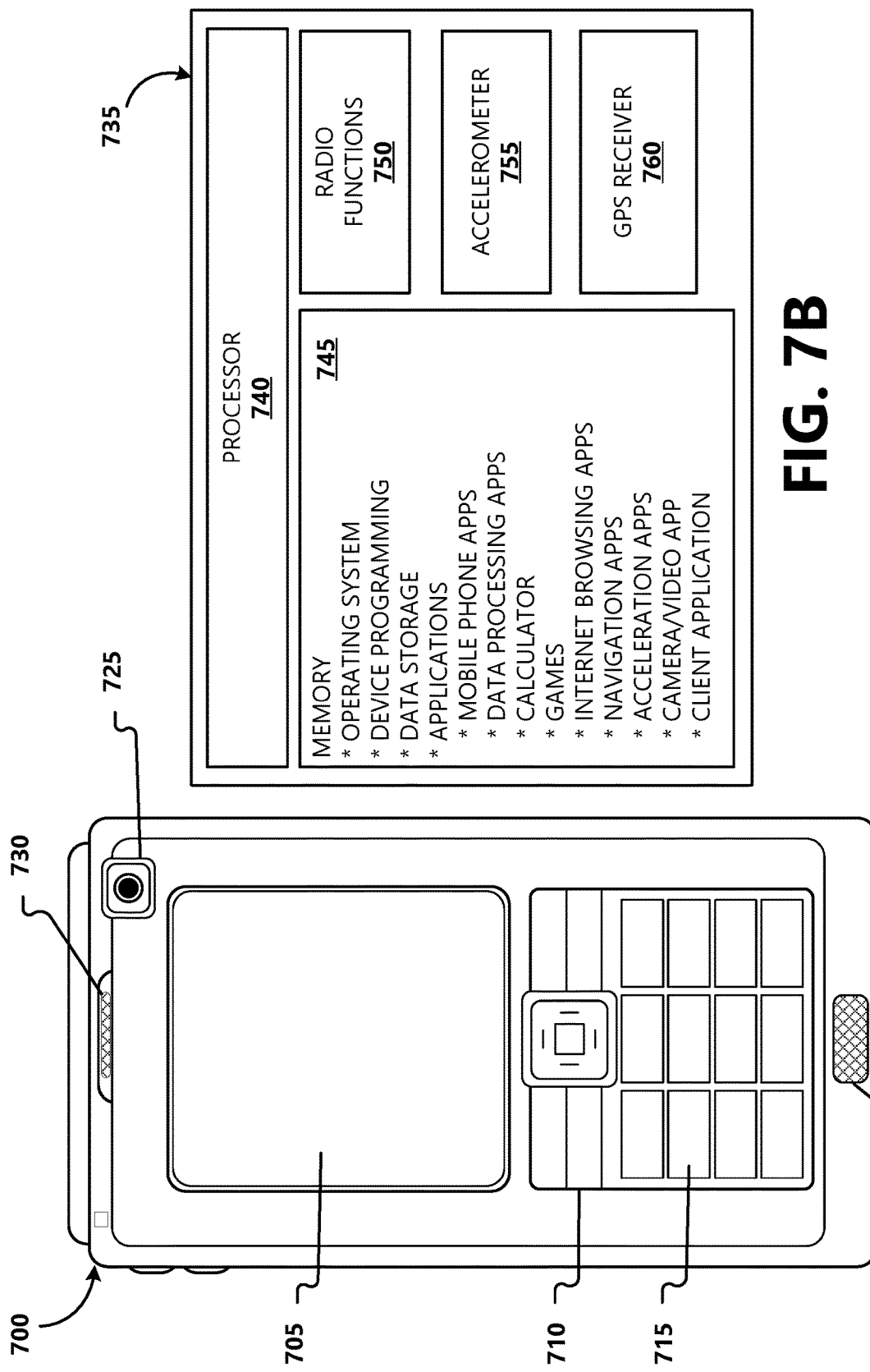
FIGS. 7A and 7B are block diagrams illustrating example physical components of a suitable mobile computing environment with which aspects of the present disclosure can be practiced.

FIGS. 7A-7B illustrate a suitable mobile computing device 700 or environment, for example, a mobile computing device or smart phone, a tablet personal computer, a laptop computer, or other user device 102, with which aspects can be practiced. The mobile computing device 700 is illustrative of any suitable device operative to send, receive and process wireless communications. A display screen 705 is operative for displaying a variety of information such as information about incoming and outgoing communications, as well as, a variety of data and displayable objects, for example, text, alphanumeric data, photographs, and the like.

Data input to the mobile computing device 700 can be performed via a variety of suitable means, such as, touch screen input via the display screen 705, keyboard or keypad input via a data entry area 710, key input via one or more selectable buttons or controls 715, voice input via a microphone 718 disposed on the mobile computing device 700, photographic input via a camera 725 functionality associated with the mobile computing device 700, or any other suitable input means. Data can be output via the mobile computing device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a computer processor for processing incoming and outgoing data and communications and controlling operation of the device and associated software applications via a mobile computing device operating system. Memory 745 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 can contain an accelerometer 755 for detecting acceleration, and can be used to sense orientation, vibration, and/or shock. Mobile computing device 700 can contain a global positioning system (GPS) system (e.g., GPS send/receive functionality) 760. A GPS system 770 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the mobile computing device 700 to communicate with other communication devices and systems via a wireless network. Radio functions 750 can be utilized to communicate with a wireless or WIFI-based positioning system to determine a device location.

Figure 8:
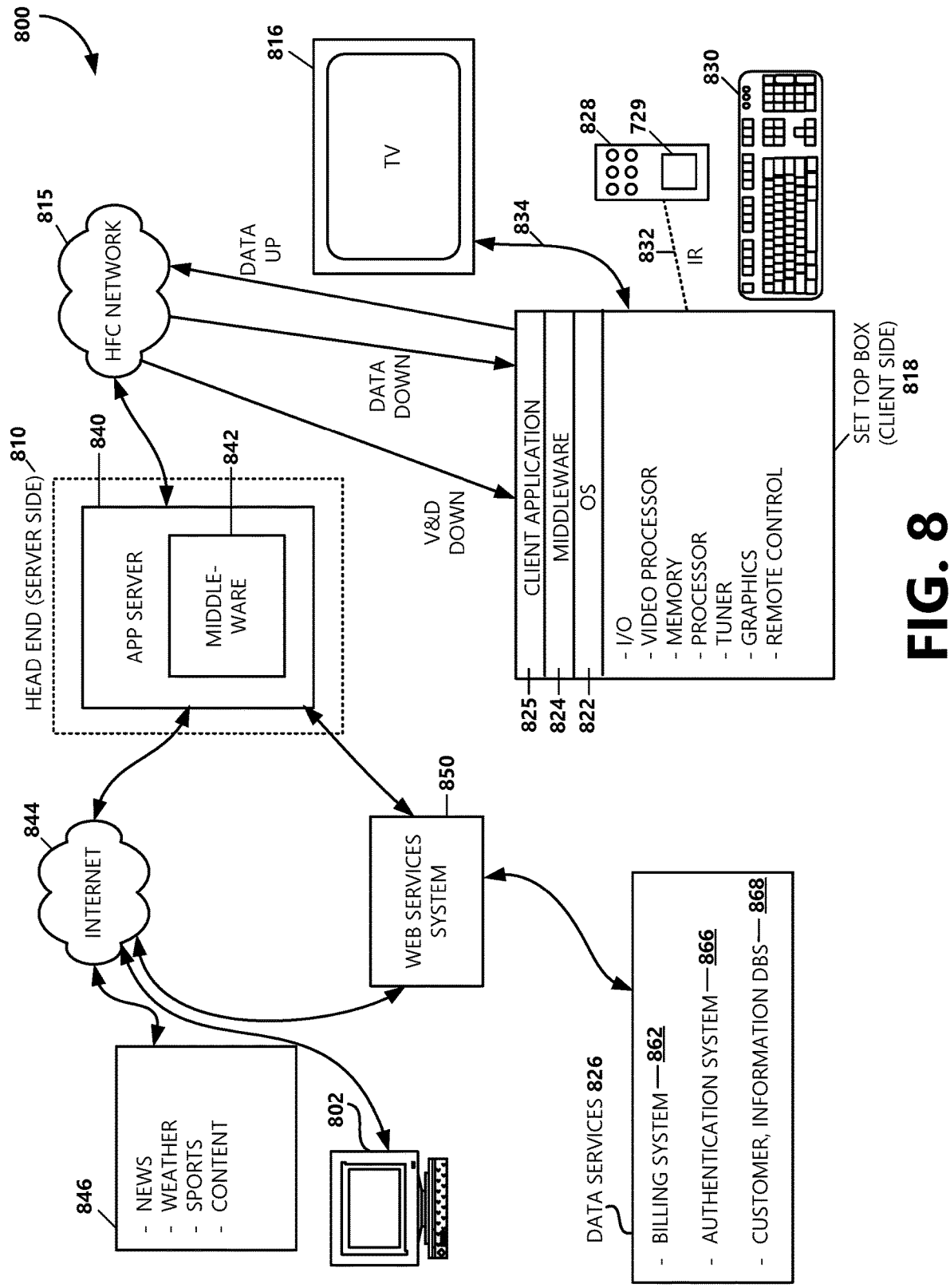
FIG. 8 is a block diagram illustrating components of a cable services system architecture providing an example operating environment according to aspects of the present disclosure.

FIG. 8 is a block diagram illustrating a cable television services system 800 (hereafter referred to as "CATV") architecture providing an operating environment according to an aspect. Referring now to FIG. 8, digital and analog video programming, information content, and interactive television services are provided via a hybrid fiber coax (HFC) network 815 to a television set 816 for consumption by a cable television/services system customer. As is known to those skilled in the art, HFC networks 815 combine both optical fiber and coaxial cable lines. Typically, optical fiber runs from the cable head end 810 to neighborhoods of subscribers. Coaxial cable runs from the optical fiber feeders to each customer or subscriber. The functionality of the HFC network 815 allows for efficient bidirectional data flow between the set-top box 818 and the application server 840 of the aspect.

The CATV system 800 is in the form of a distributed client-server computing system for providing video and data flow across the HFC network 815 between server-side services providers (e.g., cable television/services providers) via a server-side head end 810 and a client-side customer via a set-top box (STB) 818 functionally connected to a customer receiving device, such as the television set 816. As is understood by those skilled in the art, modern CATV systems 800 can provide a variety of services across the HFC network 815 including traditional digital and analog video programming, telephone services, high speed Internet access, video-on-demand, and services.

On the client side of the CATV system 800, digital and analog video programming and digital and analog data are provided to the customer television set 816 via the STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 815 and from customers via input devices such as a remote control device 828, keyboard 830, or other computing device, such as a tablet/slate computer, smart phone, etc. The remote control device 828 and the keyboard 830 can communicate with the STB 818 via a suitable communication transport such as the infrared connection 832. The remote control device 828 can include a biometric input module 829. The STB 818 also includes a video processor for processing and providing digital and analog video signaling to the television set 816 via a cable communication transport 834. A multi-channel tuner is provided for processing video and data to and from the STB 818 and the server-side head end system 810, described below.

The STB 818 also includes an operating system 822 for directing the functions of the STB 818 in conjunction with a variety of client applications 825. For example, if a client application 825 requires a news flash from a third-party news source to be displayed on the television 816, the operating system 822 can cause the graphics functionality and video processor of the STB 818, for example, to output the news flash to the television 816 at the direction of the client application 825 responsible for displaying news items.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 815 through a video/data downlink and data via a data downlink. The STB 818 can transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the STB 818 for use by the STB 818 and for distribution to the television set 816. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 815 and the set-top box 818 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 815 to the STB 818. Operation of data transport between components of the CATV system 800, described with reference to FIG. 8, is well known to those skilled in the art.

Referring still to FIG. 8, the head end 810 of the CATV system 800 is positioned on the server side of the CATV system and includes hardware and software systems responsible for originating and managing content for distributing through the HFC network 815 to client-side STBs 818 and other computing devices 802 for presentation to customers. As described above, a number of services can be provided by the CATV system 800, including digital and analog video programming, interactive television services, telephone services, video-on-demand services, targeted advertising, and/or provision of supplemental content.

The application server 840 can be configured as a computing system operative to assemble and manage data sent to and received from the STB 818 via the HFC network 815. As described above, the application server 840 includes a middleware layer 842 for processing and preparing data from the head end 810 of the CATV system 800 for receipt and use by the client-side STB 818. For example, the application server 840 via the middleware layer 842 can obtain supplemental content from third-party services 846 via the Internet 844 for transmitting to a customer through the HFC network 815, the STB 818, and recording by a local or remote DVR. For example, content metadata from a third-party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 815 where the XML-formatted data can be utilized by a client application 825 in concert with the middleware layer 824, as described above. As should be appreciated by those skilled in the art, a variety of third-party services data 846, including news data, weather data, sports data and other information content can be obtained by the application server 840 via distributed computing environments such as the Internet 844 for provision to customers via the HFC network 815 and the STB 818.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt.

A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer.

The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. An authentication system 866 can include information such as secure user names, subscriber profiles, subscriber IDs, and passwords utilized by customers for access to network services. As should be understood by those skilled in the art, the disparate systems 850, 862, 866, 868 can be integrated or provided in any combination of separate systems, wherein FIG. 8 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing an online marketplace for edge computing resources, comprising:
   at least one processor;
   a memory storage device including instructions that when executed by the at least one processor are configured to:
      receive a request from a third party for an edge computing resource on which a set of third-party services associated with a third-party resource can be deployed for performing a third-party service functionality, wherein the request includes a location condition and attribute data that define one or more characteristics of a computational resource for performing the third-party service functionality;
      determine one or more optimized edge computing resources that satisfy the location condition and the attribute data;
      provide a listing of the one or more optimized edge computing resources;
      receive a third-party selection of an edge computing resource of the one or more optimized edge computing resources; and
      provide a configuration portal for transmitting a data file to a resource management and orchestration system, wherein the data file includes instructions for instantiating the set of third-party services as a virtualized network function (VNF) and deploying the VNF on the selected optimized edge computing resource for performing the third-party service functionality.

2. The system of claim 1, wherein the system is further configured to:
   determine a value associated with each of the one or more optimized edge computing resources; and
   include the determined values in the listing of the one or more optimized edge computing resources.

3. The system of claim 2, wherein the system is further configured to provide a transaction interface to the third party, wherein the transaction interface provides an interface for allowing the third party to remit payment to a provider of the selected optimized edge computing resource for utilization of the selected optimized edge computing resource based on the determined value of the selected optimized edge computing resource.

4. The system of claim 1, wherein the system is further configured to determine an optimized location for an additional edge computing resource in a network based on a determined demand for available edge computing resources in association with a location, wherein the demand is determined based on received third-party requests.

5. The system of claim 1, wherein the system is further configured to communicate a location of the VNF to the third-party for enabling the third party to direct or redirect traffic to the selected optimized edge computing resource.

6. The system of claim 1, wherein the system is further configured to:
receive an indication of one or more strategic objectives of the third party in association with usage of an edge computing resource;
for each of the one or more optimized edge computing resources, determine a score associated with satisfaction of the one or more strategic objectives based on one or more attributes of each optimized edge computing resource; and
include an indication of the scores in the listing of the one or more optimized edge computing resources.

7. The system of claim 1, wherein in determine one or more optimized edge computing resources, the system is configured to query an inventory of edge computing resources for edge computing resources that satisfy the location condition and at least one of:
a central processing unit condition;
a memory condition;
a network performance condition;
a price condition;
an edge computing resource type condition;
an edge computing resource provider condition;
a date/time condition; and
a use case condition.

8. The system of claim 7, wherein the inventory includes one of:
an edge marketplace database including edge computing resources provided by a plurality of edge computing resource providers; or
an edge resource pool of an edge computing resource provider system, wherein the system is operated by an edge computing resources provider system.

9. The system of claim 8, wherein in deploying the VNF, the system is configured to:
allocate virtual resources for the VNF;
configure parameters of the VNF based on the data file; and
activate a VNF instance for triggering it to perform the third-party service functionality.

10. The system of claim 9, wherein the system is further configured to:
deploy the VNF during a client session with the third-party resource; and
communicate a location of the VNF to the third-party for enabling the third party to re-direct traffic associated with the client session to the VNF for performing the third-party service functionality as part of the client session.

11. A method for providing an online marketplace for edge computing resources, the method comprising:
receiving data from one or more providers of edge computing resources about available edge computing resources on which a set of third-party services associated with a third-party resource can be deployed for performing a third-party service functionality;
storing the received data;
providing an interface configured to receive a request from a third-party computing device of a third party for an edge computing resource on which a set of third-party services associated with a third-party resource can be deployed for performing a third-party service functionality;
receiving the request from the third-party computing device, wherein the request includes a location condition and attribute data that define one or more characteristics of a computational resource for performing the third-party service functionality;
determining one or more optimized edge computing resources that satisfy the location condition and the attribute data based on the received data;
updating the interface to include a listing of the one or more optimized edge computing resources;
receiving a third-party selection of an edge computing resource of the one or more optimized edge computing resources; and
providing a configuration portal to the third party for transmitting a data file to a resource management and orchestration system, wherein the data file includes instructions for instantiating the set of third-party services as a virtualized network function (VNF) and deploying the VNF on the selected optimized edge computing resource for performing the third-party service functionality at a requested date and time.

12. The method of claim 11, further comprising:
determining a value associated with each of the one or more optimized edge computing resources; and
including the determined values in the listing of the one or more optimized edge computing resources.

13. The method of claim 12, further comprising providing a transaction interface to the third party, wherein the transaction interface provides an interface for allowing the third party to remit payment to a provider of the selected optimized edge computing resource for utilization of the selected optimized edge computing resource based on the determined value of the selected optimized edge computing resource.

14. The method of claim 11, further comprising determining an optimized location for an additional edge computing resource in a network based on received third-party requests for available edge computing resources in association with the optimized location.

15. The method of claim 14, wherein determining the optimized location comprises:
determining a forecasted demand for a particular edge computing resource at a particular location based on the received third-party requests; and
determining whether the forecasted demand satisfies criteria that support an expenditure of costs associated with creating the particular edge computing resource.

16. The method of claim 11, further comprising:
receiving an indication of one or more strategic objectives of the third party in association with usage of an edge computing resource;
for each of the one or more optimized edge computing resources, determining a score associated with satisfaction of the one or more strategic objectives based on one or more attributes of each optimized edge computing resource; and
updating the interface to include an indication of the scores in the listing of the one or more optimized edge computing resources.

17. The method of claim 11, wherein the received data includes descriptive information about the available edge computing resources that can be evaluated for determining whether a particular available edge computing resource satisfies requirements associated with performing the third-party service functionality.

18. The method of claim 17, further comprising querying an inventory of edge computing resources that includes one of:
   querying an edge marketplace database comprising edge computing resources provided by a plurality of edge computing resource providers; or
   querying an edge resource pool of an edge computing resource provider system, wherein the marketplace is operated by an edge computing resources provider system.

19. The method of claim 18, further comprising:
   deploying the VNF during a client session with the third-party resource; and
   communicating an address of the VNF to the third party for enabling the third party to:
      re-direct traffic associated with the client session to the address of the VNF for performing the third-party service functionality as part of the client session; and
      direct other client traffic during a requested time period to the address of the VNF.

20. A computer readable storage device that includes executable instructions which, when executed by a processor:
   use a resources engine as part of receiving data from one or more providers of edge computing resources about available edge computing resources on which a set of third-party services associated with a third-party resource can be deployed for performing a third-party service functionality;
   use an interface engine as part of:
      providing an interface configured to receive a request from a third-party computing device for available edge computing resources; and
      receiving the request from the third-party computing device, wherein the request includes a location condition and attribute data that define one or more characteristics of a computational resource for performing the third-party service functionality;
   further use the resources engine as part of determining one or more optimized edge computing resources that satisfy the location condition and the attribute data based on the received data;
   further use the interface engine as part of:
      updating the interface to include a listing of the one or more optimized edge computing resources; and
      receiving a third-party selection of an edge computing resource of the one or more optimized edge computing resources;
   use a configuration portal as part of receiving a third-party data file; and
   use a resource management and orchestration system as part of instantiating the set of third-party services as a virtualized network function (VNF) and deploying the VNF on the selected optimized edge computing resource for performing the third-party service functionality for a requested time period.

* * * * *